US012673639B2

(12) United States Patent
Cheikh et al.

(10) Patent No.: US 12,673,639 B2
(45) Date of Patent: Jul. 7, 2026

(54) METHOD FOR ACTIVATING A VEHICLE FUNCTION, AND ASSOCIATED ACTIVATION DEVICE

(71) Applicant: Continental Automotive Technologies GmbH, Hannover (DE)

(72) Inventors: Mohamed Cheikh, Toulouse (FR); Rachid Benbouhout, Auterive (FR); Benjamin Dubois, Bailleau-l'Evêque (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 3 days.

(21) Appl. No.: 18/796,447

(22) Filed: Aug. 7, 2024

(65) Prior Publication Data
US 2025/0091549 A1     Mar. 20, 2025

(30) Foreign Application Priority Data

Sep. 20, 2023     (FR) ................................. FR2309961

(51) Int. Cl.
*B60R 25/30*          (2013.01)
*B60R 25/01*          (2013.01)
(Continued)

(52) U.S. Cl.
CPC ............ *B60R 25/305* (2013.01); *B60R 25/01* (2013.01); *B60R 25/25* (2013.01); *B60R 25/31* (2013.01)

(58) Field of Classification Search
None
See application file for complete search history.

(56) References Cited

U.S. PATENT DOCUMENTS 3,936,602 A   *   2/1976   Korver ..................... H04Q 3/00
                                                              370/518
2007/0110126 A1*   5/2007   Sekiguchi .......... H04B 1/71632
                                                              375/130

(Continued)

FOREIGN PATENT DOCUMENTS

CN          101866499 B   *   4/2012
WO          2022223157 A1   10/2022

OTHER PUBLICATIONS

Eirini Karapistoli, An Overview of the IEEE 802.15.4a Standard, IEEE Communications Magazine (Year: 2010).*
Chen, Junlin, et al., "Link and Energy Adaptive UWB-based Embedded Sensing with Renewable Energy", Circuits and Systems (ISCAS), 2013 IEEE International Symposium, May 19, 2013, pp. 1825-1828. (4 pages).

(Continued)

*Primary Examiner* — Arslan Azhar
(74) *Attorney, Agent, or Firm* — Buchanan Ingersoll & Rooney PC

(57)          ABSTRACT
A method for activating a vehicle function, by way of an activation device, based on a visual recognition of a user. The activation device including at least one camera oriented toward the outside of the vehicle and equipped with visual recognition, and at least one ultra-wideband transceiver for detecting a presence inside the vehicle. The transceiver being modified to allow transmission to the outside of the vehicle at different refresh rates. The method includes: transmitting to the outside of the vehicle at a first refresh rate; receiving the reflected waves; detecting presence in a predetermined area around the vehicle; adapting the refresh rate according to a distance between the presence and the vehicle; activating the camera only when the presence is detected at a distance below a threshold value; identifying the presence by way of visual recognition; if the presence is identified as being the user, activating the vehicle function.

6 Claims, 4 Drawing Sheets

(51) Int. Cl.
    *B60R 25/25*         (2013.01)
    *B60R 25/31*         (2013.01)

(56)           References Cited

U.S. PATENT DOCUMENTS

| | | | |
|---|---|---|---|
| 2014/0358681 A1* | 12/2014 | Satoh | H04N 1/00344 |
| | | | 705/14.53 |
| 2020/0305142 A1* | 9/2020 | Jang | H04W 72/51 |
| 2020/0309941 A1* | 10/2020 | Makari | G01S 5/0218 |
| 2021/0009080 A1 | 1/2021 | Hu et al. | |
| 2023/0244994 A1* | 8/2023 | Cooper | G06N 20/00 |
| | | | 706/12 |
| 2024/0181988 A1 | 6/2024 | Buzanin et al. | |
| 2024/0367660 A1* | 11/2024 | Wu | B60R 25/2018 |

OTHER PUBLICATIONS

Ishak, Khairul Anuar, et al., "A Face Detection and Recognition System for Intelligent Vehicles", Information Technology Journal, Mar. 2006, vol. 5, No. 3, pp. 507-515. (10 pages).

Kumar G S, Chetan, et al., "Face Recognition Based Car Ignition System", International Research Journal of Modernization in Engineering Technology and Science, Oct. 2021, vol. 3, Issue 10, pp. 1227-1233. (7 pages).

Raman, Kirbana Jai, et al., "Driver Face Recognition: Anti-Theft System", Indian Journal of Science and Technology, May 2018, vol. 11, No. 20, pp. 1-6. (6 pages).

Search Report and Written Opinion with machine translation mailed on Mar. 19, 2024 by the French Patent Office in corresponding French Patent Application No. 2309961. (16 pages).

\* cited by examiner

METHOD FOR ACTIVATING A VEHICLE FUNCTION, AND ASSOCIATED ACTIVATION DEVICE

CROSS REFERENCE TO RELATED APPLICATION

This application claims priority to French Application No. 2309961, filed Sep. 20, 2023, the contents of such application being incorporated by reference herein.

FIELD OF THE INVENTION

The invention relates to a method for activating a vehicle function and to an associated activation device. The invention applies particularly to the "hands-free" locking and unlocking of the vehicle by way of visual recognition of the user.

BACKGROUND OF THE INVENTION

Nowadays, it is known practice to unlock electronic equipment by way of visual recognition of its user; it is thus possible to unlock a cell phone.

Similarly, a user can access their vehicle and unlock the doors by way of recognition of their face. This thus allows them to access their vehicle without having to carry a badge or a key or even a mobile smartphone. With this aim, the method for accessing the vehicle comprises the following steps:

a. a preliminary learning phase that collects biometric information about the individuals to be identified (also called the enrolment phase), b. a phase of detecting the presence of a face in the image, c. a phase of segmenting and processing the image of the face, d. a phase of recognizing and authenticating the face, e. finally, a phase of unlocking the openings of the vehicle if the face has been authenticated.

Various solutions are known from the prior art for successfully carrying out these various steps. Thus, it is known practice to equip the vehicle with cameras in order to detect the presence of a face, and with processing means in order to authenticate the latter. However, this involves continuous monitoring by the cameras, which is relatively energy consuming. A camera consumes 1 to 2 watts, which is not negligible when the vehicle is stationary. Moreover, the reaction time of a camera is relatively long, of the order of 1 to 2 seconds, which can produce a so-called "wall" effect for the user, since the doors then take a certain time to be unlocked.

One solution may be to equip the vehicle with a motion sensor, and therefore to activate the camera only when the presence of the user has been detected, thus considerably reducing the power consumption of the camera. However, the cost of the complete system is high.

SUMMARY OF THE INVENTION

It is therefore found to be necessary to overcome the drawbacks of the prior art by proposing a method for activating a vehicle function that is inexpensive, allows rapid unlocking of the doors and consumes little energy.

An aspect of the invention proposes a method for activating a vehicle function and an associated activation device that satisfy the above-mentioned goals.

An aspect of the invention relates to a method for activating a vehicle function, by way of an activation device, on the basis of a visual recognition of a user, the activation device comprising at least one camera that is oriented toward the outside of the vehicle and equipped with visual recognition means, and at least one ultra-wideband transceiver capable of detecting a presence inside the vehicle, the method being noteworthy in that the transceiver is first modified to allow it to transmit to the outside of the vehicle at different refresh rates and in that it comprises the following steps:

a) transmitting ultra-wideband waves to the outside of the vehicle at a first refresh rate, b) receiving the reflected waves, c) detecting presence in a predetermined area around the vehicle, d) adapting the refresh rate according to a distance (d) between said presence and the vehicle, the frequency being higher when the presence is close to the vehicle, e) activating the camera only when the presence has been detected at a distance below a threshold value, f) identifying the presence by way of visual recognition, g) if the presence is identified as being the user, activating the vehicle function.

Preferably, the value of the refresh rate varies from 1 Hz to more than 100 Hz.

Advantageously, the distance is determined by computing a time of flight of the waves and/or by computing an offset between a frequency of the transmitted waves and a frequency of the received reflected waves.

An aspect of the invention also relates to a device for activating a vehicle function, activation being triggered by visual recognition of a user, the activation device comprising at least one camera that is oriented toward the outside of the vehicle and equipped with visual recognition means, and at least one ultra-wideband transceiver capable of detecting a presence inside the vehicle, the device being noteworthy in that said transceiver is modified in order to transmit to the outside of the vehicle and in that it moreover comprises:

a) means for altering a refresh rate of the transmitted waves, b) means for detecting presence in a predetermined area around the vehicle, and for adapting the detection means according to a position of the presence, c) means for adapting the refresh rate according to a distance between said presence and the vehicle, the frequency being higher when the presence is close to the vehicle, d) means for activating the camera only when the presence has been detected at a distance below a threshold value, e) means for activating the vehicle function according to the result of identification of said presence by way of visual recognition.

Advantageously, the value of the refresh rate varies between 1 Hz and more than 100 Hz.

Judiciously, the means for detecting and for adapting said means comprise means for computing a time of flight of the waves and/or for computing an offset between a frequency of the transmitted waves and a frequency of the received waves.

An aspect of the invention also relates to any computer program product comprising program code instructions for executing the steps of the method according to any one of the features listed above when said program is executed on a computer.

Finally, an aspect of the invention applies to any motor vehicle comprising an activation device according to any one of the features listed above.

BRIEF DESCRIPTION OF THE DRAWINGS

Other features and advantages of aspects of the invention will become apparent on reading the description that follows. This description is purely illustrative and should be read with reference to the attached drawings, in which.

DETAILED DESCRIPTION OF EXEMPLARY EMBODIMENTS

Figure 1:
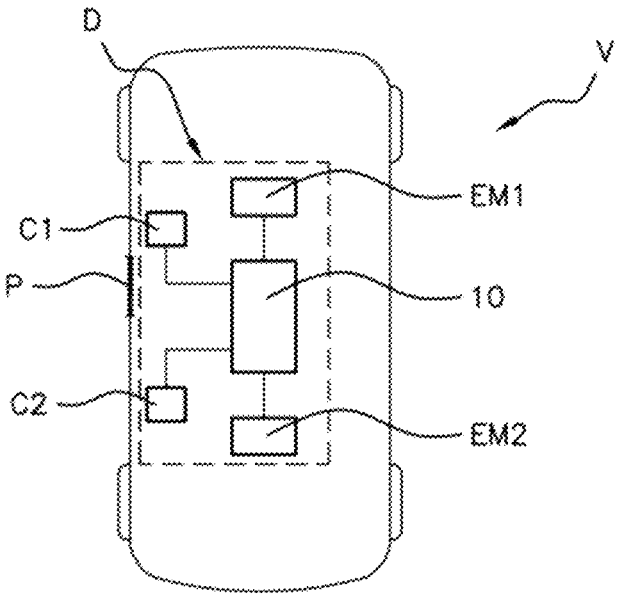
FIG. 1 is a schematic representation of a motor vehicle equipped with the activation device according to an aspect of the invention.

FIG. 1 shows a motor vehicle V equipped with the device D for activating a vehicle function according to an aspect of the invention.

The vehicle function may be either locking or unlocking the openings of the vehicle V, for example unlocking the driver's door P, that is to say the access to the vehicle V.

Activation of the function is triggered by visual recognition of a user authorized to use the vehicle V. A prior authentication of the user's face has been performed by the vehicle V in order to record and store the data pertaining to their face in order to authorize a subsequent access request.

Visual recognition for accessing equipment is known to those skilled in the art and will not be described in more detail here.

According to an aspect of the invention, the activation device D comprises at least one camera C1, C2 that is oriented toward the outside of the vehicle and equipped with visual recognition means, and an ultra-wideband (UWB) transceiver EM1 capable of detecting a presence inside the vehicle. In the example illustrated in FIG. 1, two cameras C1, C2 are on each side of the driver's door P.

The camera C1 is thus capable of visually displaying any object that is close to the vehicle on the side where the camera is fixed, preferably close to the opening, here the door that is intended to be locked or unlocked.

The ultra-wideband (UWB) transceiver EM1 is itself preferably inside the vehicle V and is used to detect any presence in the passenger compartment, for example the presence of a child.

In the example illustrated in FIG. 1, two transceivers EM1, EM2 are in the passenger compartment of the vehicle V. Two transmitters rather than only one enable a presence in the passenger compartment to be localized more accurately.

According to an aspect of the invention and contrary to the prior art, the transceivers EM1, EM2 have been modified in order to transmit UWB waves that extend outside the passenger compartment in a predetermined area Z3, Z12, Z21 around the vehicle V, for example within a radius of 5 meters around the vehicle V.

With this aim, the transceivers EM1, EM2 have been modified as follows: each transmitter comprises two antennas, one antenna oriented toward the inside of the vehicle V and one antenna oriented toward the outside of the vehicle V, which therefore have different radiations because of their orientation.

A switch is connected to the two antennas and allows selection of one or the other of the two antennas. This device is known from the prior art.

Alternatively, each transceiver contains two antennas oriented in the same way but out of phase, and in phase opposition, the radiation pattern thus produced being oriented both toward the inside and toward the outside of the vehicle V. This device is also known from the prior art and will not be developed further here.

The activation device D moreover comprises a central control unit 10 electronically connected to the transceivers EM1, EM2 and to the cameras C1, C2.

This central control unit 10 is used to manage the UWB transmission and reception of waves by means of the transceivers EM1, EM2, but also to trigger activation or shutdown of the cameras C1, C2 and to process the information coming from said cameras. The central control unit 10 therefore also comprises image processing and visual recognition means. This is known from the prior art and will not be described in more detail here.

What is meant by ultra-wideband (UWB) communication is radiofrequency communication based on the transmission of pulses of very short duration, often less than one nanosecond. Thus, bandwidth may reach very high values between 250 and 500 MHz and beyond.

According to an aspect of the invention, the activation device D moreover comprises:

a. means M1 for altering a refresh rate F of the transmitted waves, b. means M2 for detecting presence in a predetermined area around the vehicle and for adapting said means according to a position of said presence, c. means M3 for adapting the refresh rate F according to a distance d, between said presence and the vehicle, the frequency being higher when the presence is close to the vehicle, d. means M4 for activating the camera only when the presence has been detected at a distance d below a threshold value, e. means M5 for activating the vehicle function according to the result of identification of said presence by way of visual recognition.

Figure 4:
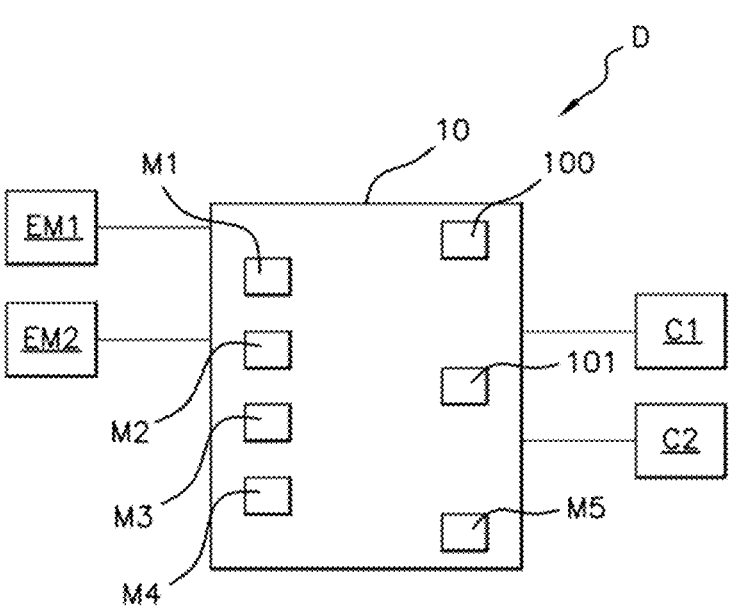
FIG. 4 is a schematic representation of the activation device according to an aspect of the invention.

The alteration means M1, the detection means M2, the frequency adaptation means M3, the means M4 for activating the camera and the means M5 for activating the vehicle function are preferably in the form of software included in an integrated circuit of the central control unit 10 (cf. FIG. 4).

Refresh rate F is understood to mean the number of frames transmitted per second. Each frame contains multiple waves of predefined duration, for example 5 ms. The refresh rate is thus used to adapt the speed at which the UWB transceiver EM1, EM2 receives data in its coverage area.

Thus, according to an aspect of the invention, the alteration means M1 are capable of altering the refresh rate F of the UWB transmitted waves from $F0=1$ Hz to more than $F2=100$ Hz. The higher the refresh rate F, the more energy the transceiver consumes, here the electricity coming from the battery of the vehicle V, and the more accurate the localization of the presence. Conversely, the lower the refresh rate F, the less energy the transceiver EM1, EM2 consumes, but the localization of a presence is also less accurate.

An aspect of the invention cleverly proposes using the variation of the refresh rate F to accurately detect a presence in an area close to the vehicle V, Z12, Z22 and thus only activating the cameras C1, C2 to trigger a visual recognition, while saving the energy in the battery, when the presence is in the area close to the vehicle V.

The means M2 for detecting a presence in a predetermined area and for adapting said means according to the position of the presence with respect to the vehicle or to the predetermined areas comprise:

a. means for computing a frequency offset between the frequency of the transmitted waves and the frequency of the reflected waves received, and b. means for computing a time of flight for the round trip by the waves between the transceiver EM1, EM2 and the presence, and c. means for determining an angle of arrival of the reflected waves received by the transceiver EM1, EM2.

These various means are known to those skilled in the art. To reduce energy consumption, when the refresh rate is slow, for example F0=1 Hz, but sufficient to detect a presence in the predetermined area Z3 furthest from the vehicle V, the detection means M2 consist only of means for computing the frequency offset. These means are of the Doppler radar type. To detect the presence in a predetermined area close to the vehicle Z12, Z22, the time of flight of the waves and the angle of arrival of the reflected waves are determined in order to obtain a more accurate location for the presence around the vehicle V and thus to compute a distance d separating the presence from the vehicle V.

Alternatively, in the case of two transceivers EM1, EM2, triangulation or cross-referencing between the data of the two transmitters allows still accurate localization.

Figure 2:
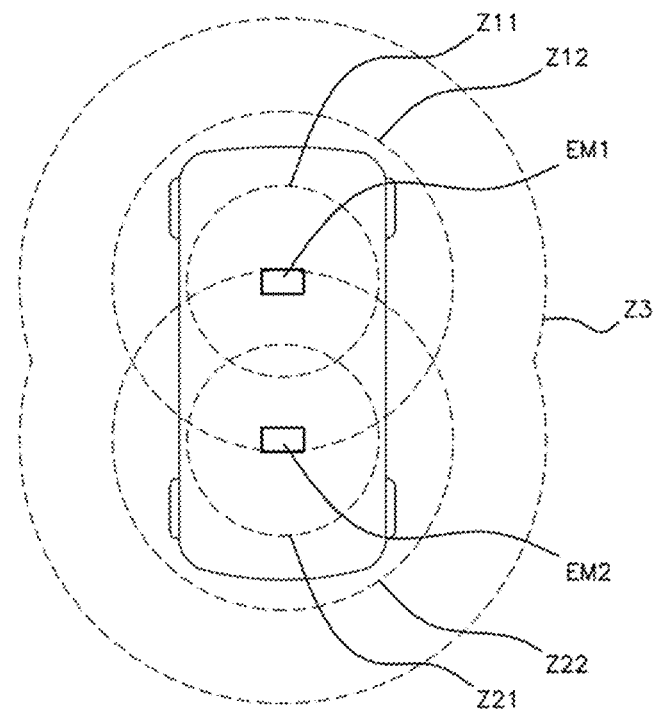
FIG. 2 is a schematic representation of the predetermined detection areas inside and outside the vehicle.

The means M4 for activating the camera are used to start up the camera or cameras C1, C2 if the presence has been detected by the transceivers EM1, EM2 in the area Z12, Z22 (cf. FIG. 2) close around the vehicle, that is to say only when said presence is at a distance d from the vehicle that is below a predefined threshold value.

Finally, the means M5 for activating the vehicle function lock or unlock the openings of the vehicle V according to the result of the visual recognition of the user U in the images captured by the cameras C1, C2.

The central control unit 10 also comprises a processor 100 and a memory 101 (cf. FIG. 4) in which are stored instructions allowing the processor to be configured to execute certain particular processing operations, and in particular to implement the steps of the activation method, according to the embodiment as described below.

Figure 5:
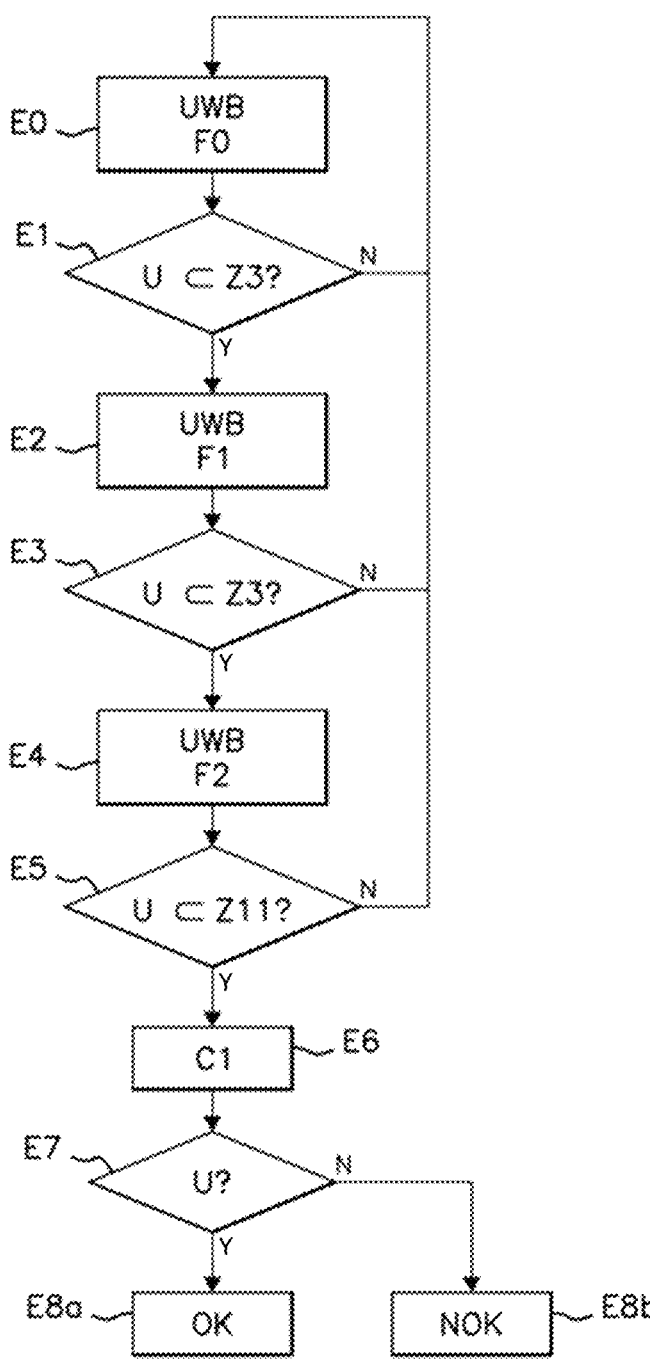
FIG. 5 is a flowchart illustrating the steps of the activation method according to an aspect of the invention.

The activation method illustrated in FIG. 5 will now be described. This method illustrates the case where the activation function is the unlocking of the openings of the vehicle V.

In a first step E1, an ultra-wideband transmission of waves using a first low refresh rate F0, of the order of 1 Hz, is triggered by the transceivers EM1, EM2 in the predetermined area Z3, that is to say within a radius of approximately 5 meters around the vehicle V. This mode of transmission at a very low refresh rate F0 has the advantage of consuming very little electrical energy, of the order of 10 mW.

If a human presence or an object is in the predetermined area (step E1) Z3, that is to say the area furthest from the vehicle V, the transmitted waves are then reflected by this presence and in return received by the vehicle V. This is illustrated in FIG. 3A.

Processing and analyzing the reflected waves, for example computing the frequency offset, as for a DOPPLER radar, is used to detect the presence in the predetermined area Z3 (for example 5 meters around the vehicle V).

If there is a presence in the predetermined area (step E1), the refresh rate is increased to a second value F1, greater than the first value, for example of the order of 10 Hz. Transmitting the waves at this refresh rate F1 (step E2) certainly consumes more energy, approximately 150 mW, but allows more accurate determination of the location of the presence and confirmation of its connection with the predetermined area Z3.

Figures 3A, 3B, 3C:
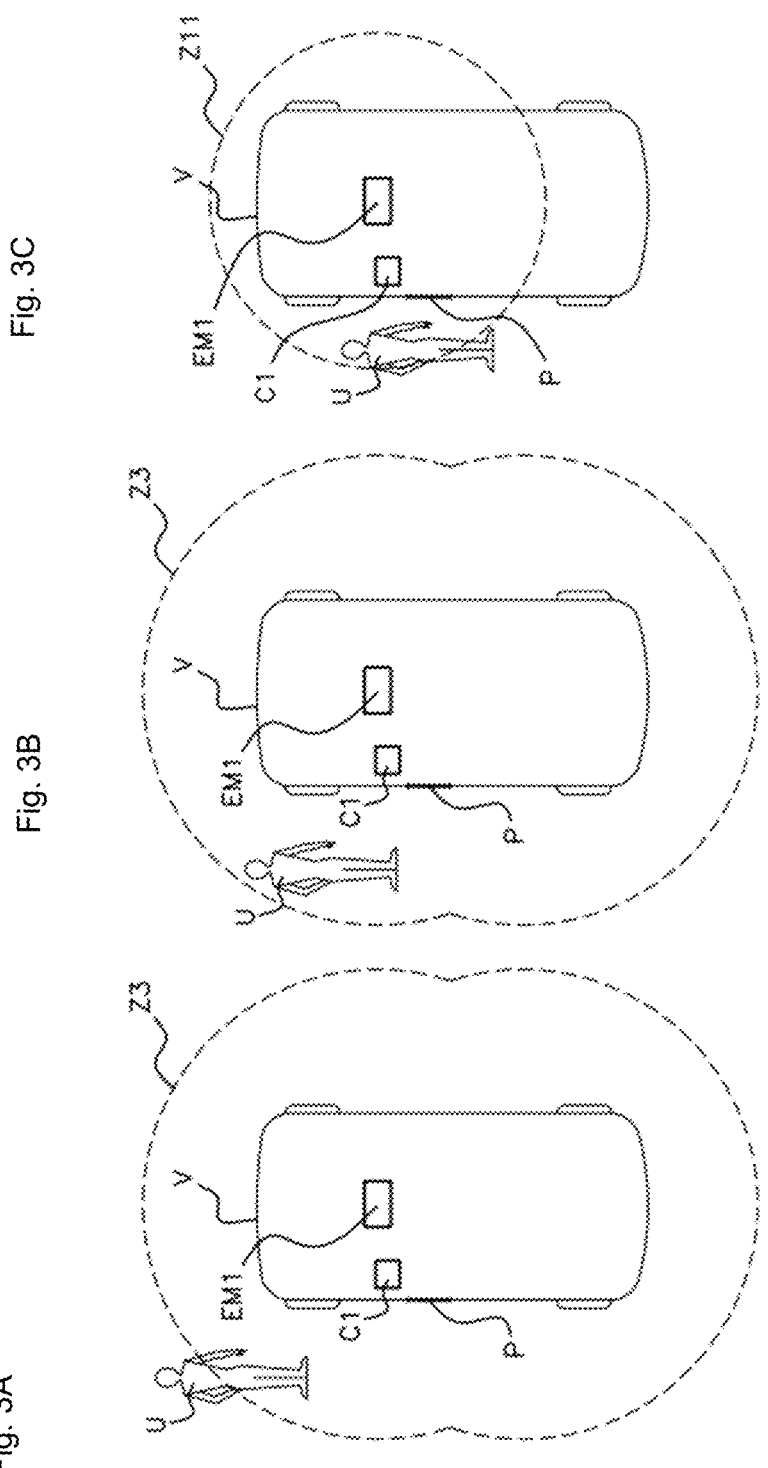
FIGS. 3A-3C is a schematic representation of the three phases of detection, localization and authentication of a user according to the activation method according to an aspect of the invention.

This is illustrated in FIG. 3B.

If said presence is confirmed in the predetermined area far from the vehicle Z3 (step E3), the refresh rate then increases to a third value F2 of approximately 100 Hz. At this speed, the power consumption is higher still, of the order of 300 mW, but transmitting waves at this frequency (step E4) makes it possible to determine whether said presence has moved closer to the vehicle and is now in an area Z12, Z22 close to the vehicle V, for example within a radius of 2 meters around the vehicle V, and to locate it accurately. This is shown in FIG. 3C.

In this case, an aspect of the invention proposes using computation of the time of flight in combination with computation of the frequency offset between the transmitted waves and the received waves and optionally determination of the angle of arrival of the reflected waves in order to more accurately estimate the distance d between said presence and the vehicle V.

If the presence is in the close area Z12, Z22 (step E5), using the transceiver EM1, EM2 as a Doppler radar makes it possible to detect a presence in the coverage area of said transmitter, that is to say 5 meters around the vehicle, and therefore to detect the intrusion of a presence in this area Z3.

Using the time of flight and the angle of arrival themselves makes it possible to more accurately locate the presence and to find out whether it is in the area Z12, Z22 close to the vehicle in order to activate the camera C1, C2. Thus, depending on the position of the presence, not only is the refresh rate adapted but also the means are used to detect said presence.

If the presence is at a distance d below a predefined threshold value, for example less than 2 meters from the vehicle, the cameras C1, C2 are then activated (step E6) to capture an image of said presence.

The image processing software is then used to recognize or not recognize (step E7) the face of a user U who is authorized to enter the vehicle V. If the user U is authenticated (step E7), the function, here the unlocking of the openings, is activated (step E8a), otherwise no function is activated (step E8b) if the result of visual recognition does not recognize an authorized user.

In the case of locking, the steps (not shown) are as follows. In the first step, UWB waves are transmitted to the outside of the vehicle at a first frequency F0=100 Hz, the reflected waves then being received by the activation device D. As the user was previously detected as being inside the vehicle by the activation device D, which was used to detect a presence in the passenger compartment, the first refresh rate F0 used is then the highest. Analyzing and processing the frequency of the received waves and/or the round-trip time of flight of the waves makes it possible to determine the distance d separating the user U from the vehicle V.

When the user leaves their vehicle, the distance is then below the threshold value because the user U is in an area Z12, Z22 close to the vehicle V.

In this case, the camera or cameras C1, C2 are activated to capture images of the presence, then to carry out a visual recognition of said presence.

If the user is identified as authorized to access their vehicle V, locking of the openings is triggered.

An aspect of the invention is particularly ingenious because it saves energy and requires little modification and is therefore inexpensive.

The invention claimed is:

1. A method for activating a vehicle function, by way of an activation device, on the basis of a visual recognition of a user, the activation device comprising at least one camera that is oriented toward the outside of the vehicle and equipped with visual recognition means, and at least one ultra-wideband transceiver capable of detecting a presence inside the vehicle, wherein the transceiver is first modified to allow it to transmit to the outside of the vehicle at different refresh rates, the method comprising:

a) transmitting ultra-wideband waves to the outside of the vehicle at a first refresh rate, b) receiving the reflected waves, c) detecting presence in a predetermined area around the vehicle, d) adapting the refresh rate according to a distance between said presence and the vehicle, the frequency being higher when the presence is close to the vehicle, e) activating the camera only when the presence has been detected at a distance below a threshold value, f) identifying the presence by way of visual recognition, and g) if the presence is identified as being the user, activating the vehicle function, wherein the value of the refresh rate varies from 1 Hz to more than 100 Hz.

2. The activation method as claimed in claim 1, wherein the distance is determined by computing a time of flight of the waves and/or by computing an offset between a frequency of the transmitted waves and a frequency of the received reflected waves.

3. A non-transitory computer program product comprising program code instructions for executing the steps of the method as claimed in claim 1 when said program is executed on a computer.

4. A device for activating a vehicle function, activation being triggered by visual recognition of a user, the activation device comprising at least one camera that is oriented toward the outside of the vehicle and equipped with visual recognition means, and at least one ultra-wideband transceiver capable of detecting a presence inside the vehicle, wherein transceiver is modified in order to transmit to the outside of the vehicle and the device further comprises:

a) means for altering a refresh rate of the transmitted waves, b) means for detecting presence in a predetermined area around the vehicle, and for adapting the means according to a position of the presence, c) means for adapting the refresh rate according to a distance between said presence and the vehicle, the frequency being higher when the presence is close to the vehicle, d) means for activating the camera only when the presence has been detected at a distance below a threshold value, and e) means for activating the vehicle function according to the result of identification of said presence by way of visual recognition, wherein the value of the refresh rate varies between 1 Hz and more than 100 Hz.

5. The activation device as claimed in claim 4, wherein the means for detecting and for adapting said means comprise means for computing a time of flight of the waves and/or for computing an offset between a frequency of the transmitted waves and a frequency of the received waves.

6. A motor vehicle comprising an activation device as claimed in claim 4.

* * * * *